US012350805B2

(12) United States Patent
Machida et al.

(10) Patent No.: US 12,350,805 B2
(45) Date of Patent: Jul. 8, 2025

(54) AUXILIARY HANDLE FOR WORK TOOL

(71) Applicant: MAKITA CORPORATION, Anjo (JP)

(72) Inventors: Yoshitaka Machida, Anjo (JP); Taro Hisano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/422,193

(22) Filed: Jan. 25, 2024

(65) Prior Publication Data

US 2024/0326216 A1 Oct. 3, 2024

(30) Foreign Application Priority Data

Mar. 28, 2023 (JP) ................................ 2023-051171

(51) Int. Cl.

| | |
|---|---|
| ***B25D 17/00*** | (2006.01) |
| ***B25D 16/00*** | (2006.01) |
| ***B25D 17/04*** | (2006.01) |

(52) U.S. Cl.

CPC ........... *B25D 17/043* (2013.01); *B25D 16/00* (2013.01)

(58) Field of Classification Search

CPC ........ B25D 16/00; B25D 17/043; B25F 5/026

See application file for complete search history.

(56) References Cited

U.S. PATENT DOCUMENTS

| | | | | |
|---|---|---|---|---|
| 8,914,947 | B2 * | 12/2014 | Weiss | B25F 5/006 16/431 |
| 10,537,984 | B2 * | 1/2020 | Steingruber | B25F 5/006 |
| 2005/0087353 | A1 | 4/2005 | Oki et al. | |
| 2010/0206595 | A1 * | 8/2010 | Kamegai | B25F 5/006 173/162.2 |
| 2011/0131766 | A1 * | 6/2011 | Imaschewski | B25F 5/026 16/426 |
| 2014/0020210 | A1 * | 1/2014 | Brennenstuhl | B25G 1/00 16/426 |
| 2016/0129579 | A1 * | 5/2016 | Friedrich | B25D 17/043 173/162.2 |

FOREIGN PATENT DOCUMENTS

| | | | | |
|---|---|---|---|---|
| EP | 3213879 | A1 * | 9/2017 | |
| EP | 3597370 | A1 * | 1/2020 | B25F 5/006 |
| JP | 5280934 | B2 | 9/2013 | |
| JP | 5345988 | B2 | 11/2013 | |
| JP | 6612157 | B2 | 11/2019 | |

* cited by examiner

*Primary Examiner* — Eyamindae C Jallow
(74) *Attorney, Agent, or Firm* — Oliff PLC

(57) ABSTRACT

An auxiliary handle for a work tool reduces vibrations transmitted to a grip. An auxiliary handle for a work tool is an auxiliary handle detachably attachable to the work tool. The auxiliary handle includes an attachment being elongated, elastically deformable, and windable around an outer circumference of the work tool, a threaded shaft including a basal portion connected to two ends of the attachment, a base being cylindrical and receiving the threaded shaft, a distal member being adjacent to a distal end of the base and receiving a distal end of the threaded shaft screwed into the distal member, and a grip being cylindrical and covering the base.

15 Claims, 4 Drawing Sheets

AUXILIARY HANDLE FOR WORK TOOL

CROSS-REFERENCE TO RELATED APPLICATIONS

This application claims the benefit of priority to Japanese Patent Application No. 2023-051171, filed on Mar. 28, 2023, the entire contents of which are hereby incorporated by reference.

BACKGROUND

1. Technical Field

The present disclosure relates to an auxiliary handle detachably attached to a work tool such as a hammer drill.

2. Description of the Background

Hammer drills described in Japanese Patent No. 6612157 (hereafter, Patent Literature 1), Japanese Patent No. 5280934 (hereafter, Patent Literature 2), and Japanese Patent No. 5345988 (hereafter, Patent Literature 3) each include a main handle to be held by a user with one hand and an auxiliary handle to be held with the other hand. The auxiliary handle includes an attachment unit attached to the outer circumference of the drill body and a rod-like grip extending from the attachment unit.

In the auxiliary handle described in Patent Literature 1, the attachment unit and the grip are integral with each other as a single member. In the auxiliary handle described in Patent Literature 2 or Patent Literature 3, the attachment unit and the grip are integral with each other with a screw on the attachment unit screwed into a fastening portion on the grip. In this work tool, vibrations are easily transmitted to the grip through the attachment unit and the fastening portion.

BRIEF SUMMARY

One or more aspects of the present disclosure are directed to an auxiliary handle for a work tool that reduces vibrations transmitted to a grip.

A first aspect of the present disclosure provides an auxiliary handle for a work tool, the auxiliary handle being detachably attachable to the work tool, the auxiliary handle including: an attachment being elongated and elastically deformable, the attachment being windable around an outer circumference of the work tool;

- a threaded shaft including a basal portion connected to two ends of the attachment;
- a base being cylindrical and receiving the threaded shaft;
- a distal member being adjacent to a distal end of the base and receiving a distal end of the threaded shaft screwed into the distal member; and
- a grip being cylindrical and covering the base.

DETAILED DESCRIPTION

Figure 1:
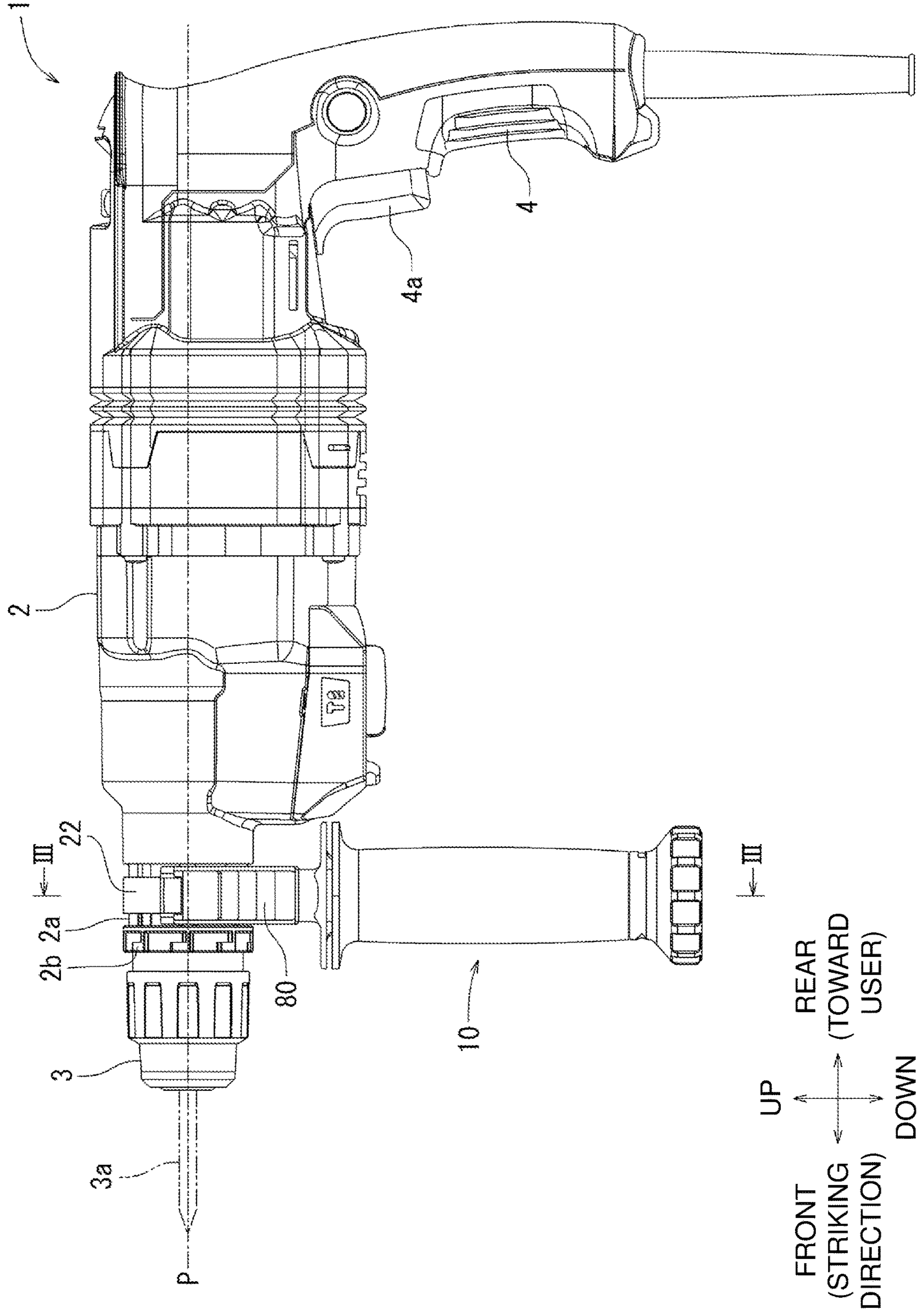
FIG. 1 is a side view of a hammer drill according to an embodiment.

One embodiment of the present disclosure will be described with reference to FIGS. 1 to 4. A hammer drill 1 shown in FIG. 1 includes a main housing 2, a drill chuck 3, a main handle 4, and a side handle 10. The main housing 2 incorporates a motor and a rotation transmission. The drill chuck 3 protrudes frontward from a front portion of the main housing 2.

As shown in FIG. 1, the main housing 2 includes a cylindrical handle mount 2*a* at its front. The side handle 10 is attached to the handle mount 2*a*. The handle mount 2*a* has a smaller diameter than the main housing 2. This causes the handle mount 2*a* to be recessed from the main housing 2. The side handle 10 attached to the handle mount 2*a* is thus restricted from moving in the axial direction of the main housing 2. The main housing 2 includes substantially L-shaped locking tabs 2*b* on its front end. The locking tabs 2*b* are multiple locking tabs 2*b* arranged at regular intervals along the outer circumference of the front end of the main housing 2. The locking tabs 2*b* are engaged with a dust collection cup (not shown). The dust collection cup prevents dust produced from a drill bit 3*a* from being blown to the main housing 2.

The drill chuck 3 is attached to a tool holder (not shown) protruding frontward from the main housing 2 in a detachable manner. The drill bit 3*a* protrudes frontward from the drill chuck 3.

The main handle 4 extends downward from the rear end of the main housing 2. The main handle 4 includes a switch lever 4*a*. The main handle 4 accommodates a switch body behind the switch lever 4*a*. The switch lever 4*a* is pulled backward with a finger of the hand holding the main handle 4 to turn on the switch body and activate the motor.

A user holds the main handle 4 with one hand (e.g., right hand) and the side handle 10 with the other hand (e.g., left hand). As shown in FIG. 1, the side handle 10 extends in a direction intersecting with the striking direction (direction along an output axis P) of the hammer drill 1. For clarity, the side handle 10 is attached vertically to extend downward from the main housing 2 in FIG. 1. However, the side handle 10 is typically attached laterally to extend leftward or rightward from the main housing 2.

Figure 2:
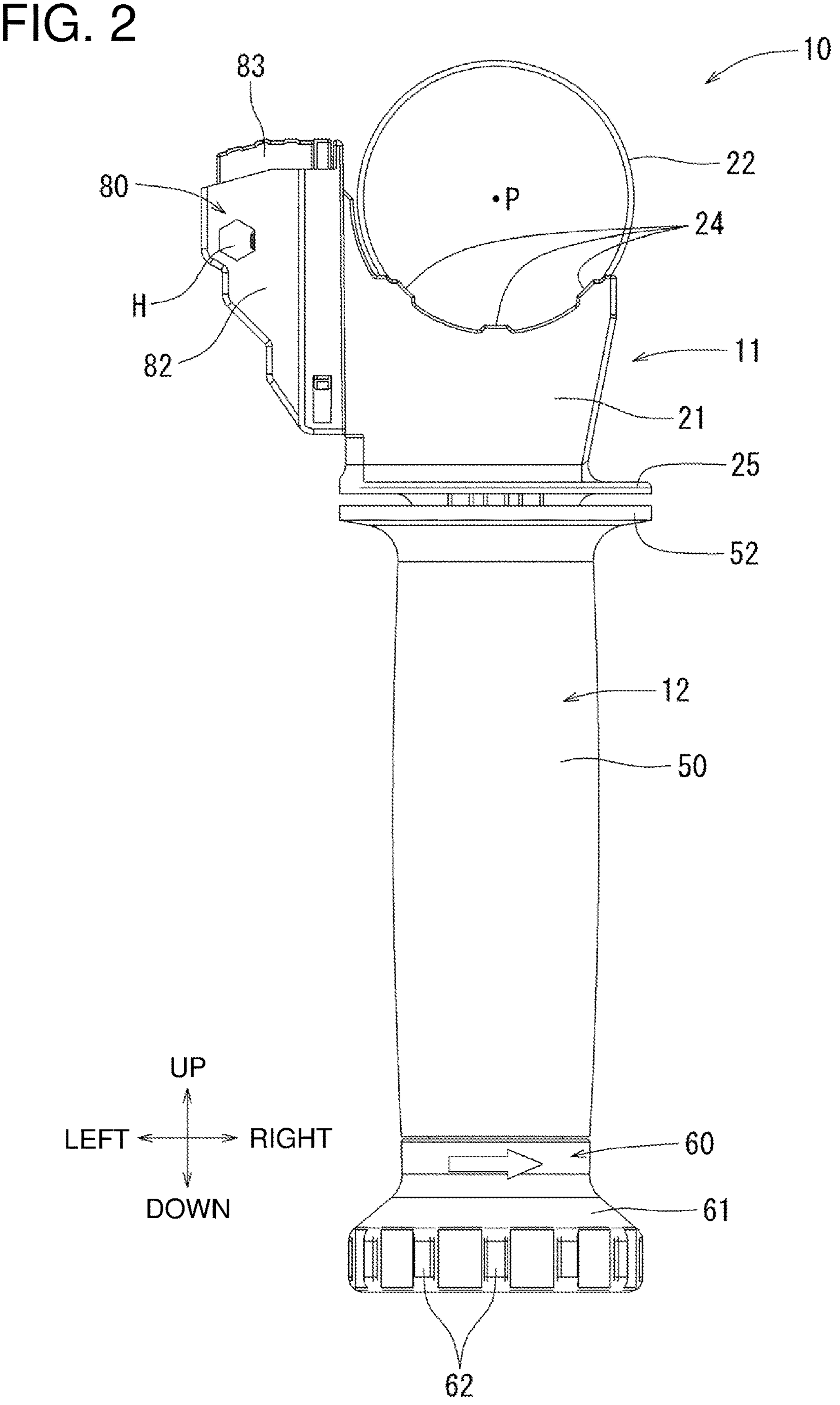
FIG. 2 is a front view of a side handle.
Figure 3:
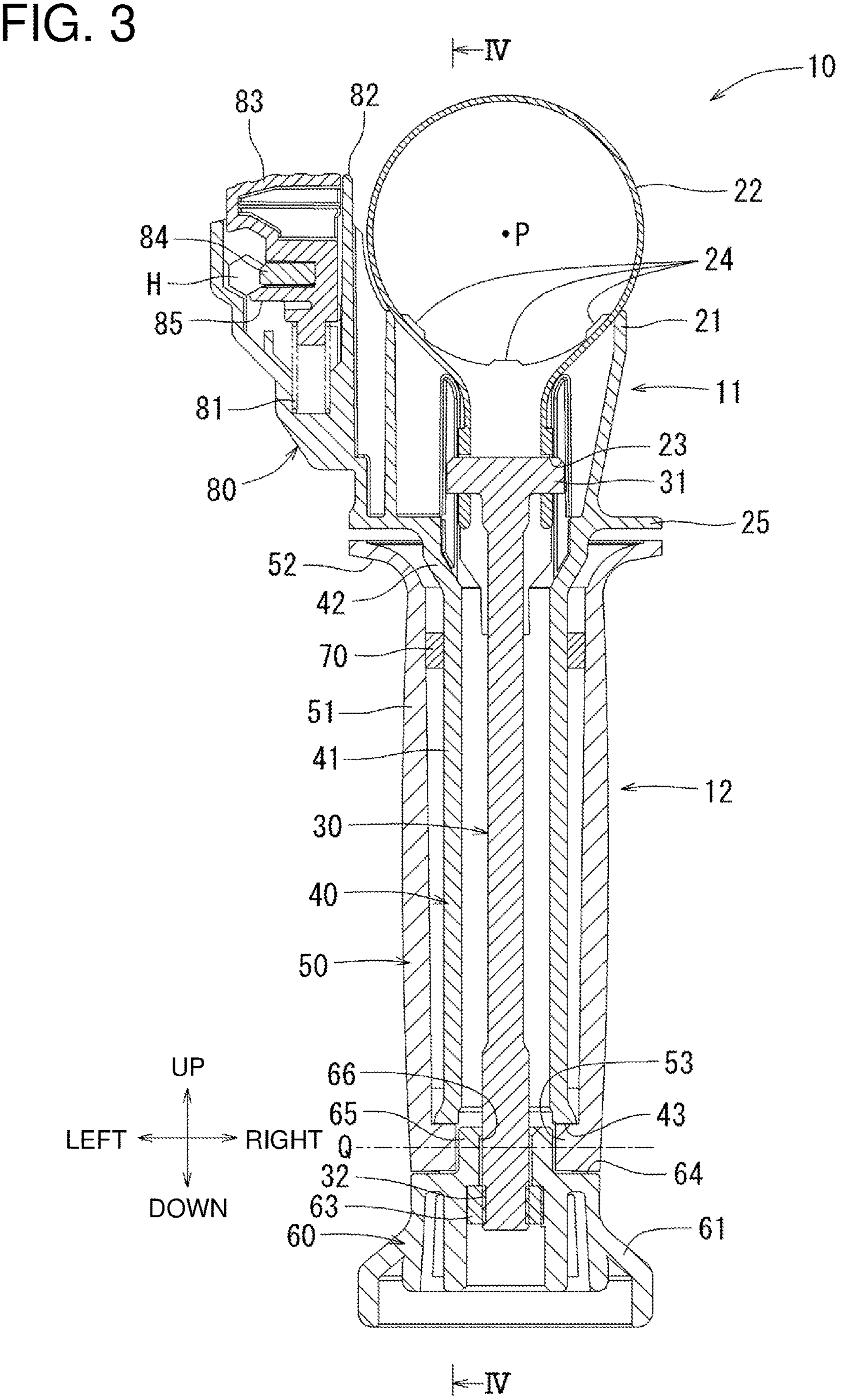
FIG. 3 is a sectional view of the side handle taken along line III-III as viewed in the direction indicated by arrows in FIG. 1.

As shown in FIG. 2, the side handle 10 includes an attachment unit 11 and a grip unit 12. As shown in FIG. 3, the attachment unit 11 includes a cover 21 and a metal band 22. The grip unit 12 includes a cylindrical base 40 and a grip 50. The grip 50 covers the base 40. The metal band 22 is a substantially annular iron member with two ends. The metal band 22 has engagement holes 23 in its two ends. A threaded shaft 30 includes a basal portion 31 engaged with the engagement holes 23. The threaded shaft 30 is received in the base 40. The threaded shaft 30 has an external thread 32 screwed onto an internal thread 63 on a distal member 60. This causes the metal band 22 to be upright on the grip unit 12 with the threaded shaft 30.

As shown in FIG. 3, the cover 21 accommodates the two ends of the metal band 22 and the basal portion 31 of the threaded shaft 30. The distal member 60 is tightened to move the metal band 22 into the cover 21. This reduces the diameter of the annular portion of the metal band 22. The annular portion is fitted to the handle mount 2*a* to attach the side handle 10 to the hammer drill 1. The cover 21 has projections 24 at its end. The projections 24 protrude inward in the radial direction of the metal band 22. The projections 24 include three projections 24 in front of the metal band 22 and three projections 24 behind the metal band 22. Each projection 24 is fitted in a recessed portion (not shown) on the handle mount 2*a*. The projections 24 lock the side handle 10 attached to the handle mount 2*a* in a circumferentially nonrotatable manner. The cover 21 includes a flange 25 at its end (lower end in FIG. 3) adjacent to the grip unit 12. The flange 25 extends radially outward.

As shown in FIG. 3, the cover 21 includes a side portion integral with a lock 80. The lock 80 includes a guide 82. The guide 82 defines an internal space that is open upward in FIG. 3. The guide 82 accommodates a lock member 83. A coil spring 81 is attached between an inner wall surface of the guide 82 and the lock member 83. The lock member 83 is urged away from the grip unit 12 under an elastic force from the coil spring 81. As shown in FIGS. 2 and 3, the guide 82 has a guide hole H. The guide hole H extends through the guide 82 in the striking direction of the hammer drill 1. The guide hole H is hexagonal. A rod-like metal stopper pole (not shown) with a hexagonal cross section is placed through the guide hole H in a manner movable parallel to the drill bit 3*a*. The user can place the stopper pole into the guide hole H with the lock member 83 pushed against the coil spring 81.

As shown in FIG. 3, the lock member 83 includes a metal engagement tab 84 and a stopper 85. The coil spring 81 urges the lock member 83 away from the grip unit 12 to allow the engagement tab 84 to engage with the stopper pole extending through the guide hole H. The stopper 85 restricts the stopper pole.

Figure 4:
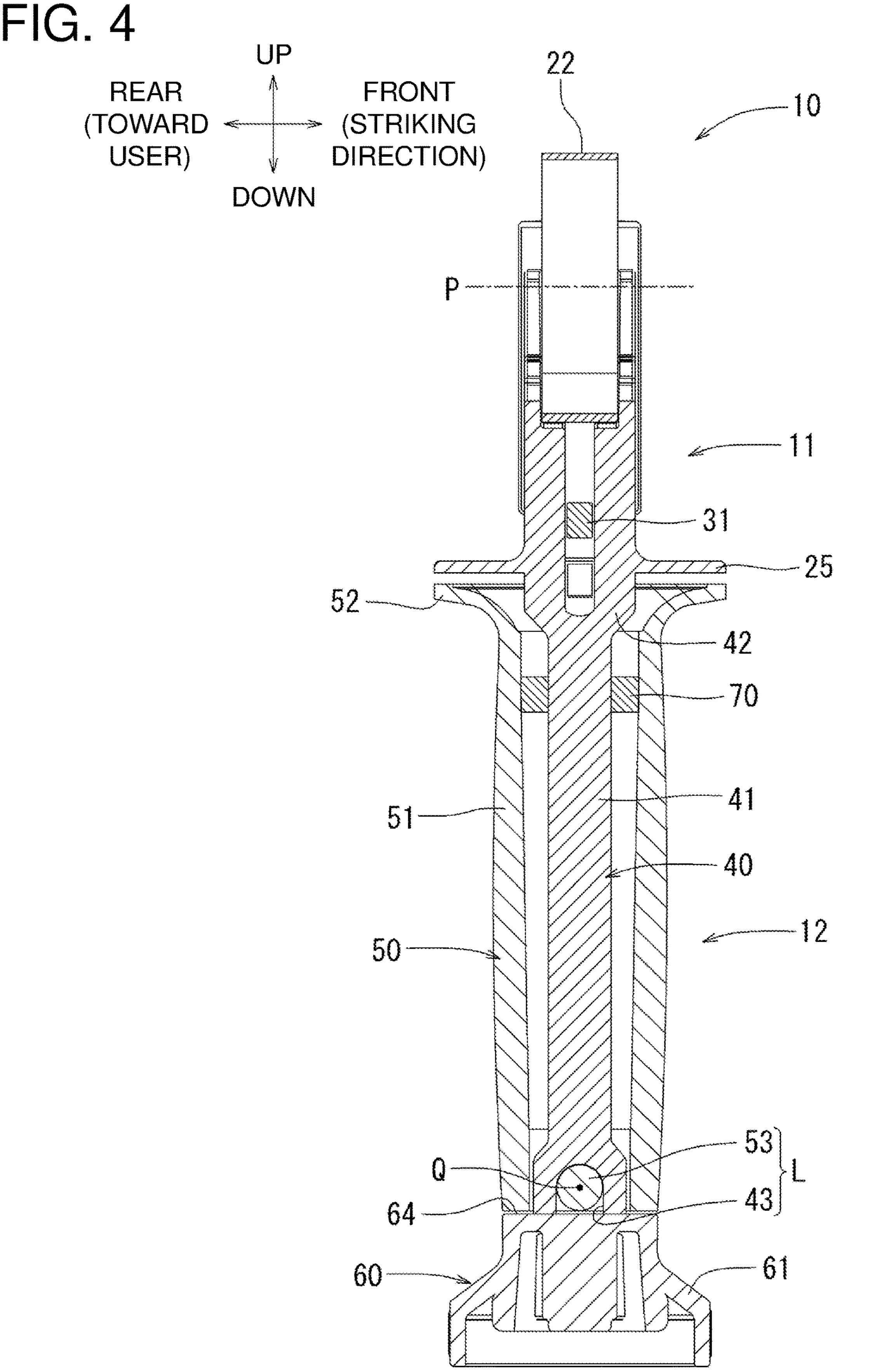
FIG. 4 is a sectional view of the side handle taken along line IV-IV in FIG. 3.

As shown in FIG. 3, the base 40 includes a base body 41. The base body 41 is cylindrical and extends linearly. The base body 41 includes a larger-diameter portion 42 at its basal end (upper end in FIG. 3). The larger-diameter portion 42 has a diameter gradually increasing from the base body 41 toward the attachment unit 11. As shown in FIG. 4, the base body 41 has two recesses 43 on its distal end (lower end in FIG. 4). Each recess 43 is open toward the distal member 60.

As shown in FIG. 3, the grip 50 includes a cylindrical grip body 51. The grip body 51 includes a flange 52 at its basal end (upper end in FIG. 3). The flange 52 extends radially outward. The grip body 51 has two protrusions 53 on its distal end (lower end in FIG. 3). Each protrusion 53 is cylindrical and protrudes radially inward. The two protrusions 53 protrude to face each other. The grip body 51 is barrel-shaped with its middle portion in the axial direction having a larger diameter than its end portions. The user can thus easily hold the grip 50.

As shown in FIG. 3, the grip 50 is placed at the distal end of the base 40 and then slid to cover the outer circumferential surface of the base 40. As shown in FIG. 4, the protrusions 53 on the grip 50 are received in the respective recesses 43 on the base 40. This allows the grip 50 to rotate about the protrusions 53 relative to the base 40. The protrusions 53 and the recesses 43 form a linkage L. The structure including the protrusions 53 as rotational shafts in the linkage L includes fewer components than a structure including another component as the rotational shaft. The axial direction (rotation axis Q) of the protrusions 53 intersects with the striking direction (output axis P) of the hammer drill 1. This allows the grip 50 to tilt in the striking direction of the hammer drill 1 relative to the base 40, thus efficiently reducing vibrations from the grip 50 in the striking direction of the hammer drill 1.

As shown in FIG. 3, an elastic member 70 is located between the grip 50 and the base 40. The elastic member 70 is a sponge sheet. The elastic member 70 is wound around and bonded to the outer circumference of the base body 41 near its basal end. The elastic member 70 is bonded with any method, such as double-sided tape or an adhesive. The grip 50 has its basal end supported by the base 40 with the elastic member 70 in between. The elastic member 70 reduces vibrations transmitted from the base 40 to the grip 50. The elastic member 70 is located at the end of the grip 50 opposite to the linkage L. The grip 50 is tiltable about the linkage L relative to the base 40. The grip 50 thus tilts more at its basal end than at its distal end. The elastic member 70 stably supports tilting of the grip 50 at the basal end to reduce vibrations.

As shown in FIG. 2, the distal member 60 has a surface flush with the outer circumferential surface of the grip 50. The distal member 60 has a larger-diameter portion 61 at its distal end (lower end in FIG. 2). The larger-diameter portion 61 has a diameter gradually increasing toward its distal end. The distal member 60 thus has a conical shape that is substantially trapezoidal in a side view. The user's hand holding the grip 50 moving toward the distal end is caught on the larger-diameter portion 61. This prevents the hand holding the grip 50 from slipping off beyond the distal end. The larger-diameter portion 61 includes multiple protruding portions 62 on its outer circumferential surface. The multiple protruding portions 62 are arranged at regular intervals in the circumferential direction. This prevents the hand holding the distal member 60 from slipping off. The user can thus easily rotate the distal member 60.

As shown in FIG. 3, the distal member 60 has a through-hole 66 in its center. The threaded shaft 30 extends through the through-hole 66. The through-hole 66 has an internal thread 63 on its distal end. The distal member 60 has a contact surface 64. The contact surface 64 is in contact with the distal end surfaces (lower end surfaces in FIG. 3) of the base 40 and the grip 50. The distal member 60 supports the grip 50 to prevent the grip 50 from being separate from the base 40. As shown in FIG. 4, the contact surface 64 covers the recesses 43 on the base 40. Each recess 43 thus has an internal space closed with its inner wall surface and the contact surface 64 of the distal member 60. This allows each protrusion 53 on the grip 50 to rotate without slipping off from the corresponding recess 43 on the base 40. The contact surface 64 includes an extension 65 at its center. The extension 65 extends to the base 40. The extension 65 is placed in the base 40. This facilitates positioning of the distal member 60 with respect to the base 40 when the distal member 60 is attached.

As shown in FIG. 2, the side handle 10 includes metal band 22 that is elongated and is elastically deformable to be wound around the outer circumference of the hammer drill 1. The basal portion 31 of the threaded shaft 30 is connected to the two ends of the metal band 22. The threaded shaft 30 extends through the cylindrical base 40. The distal member 60 is located adjacent to the distal end of the base 40. The distal end of the threaded shaft 30 is screwed into the distal member 60. The cylindrical grip 50 covers the base 40.

The threaded shaft 30 is thus screwed into the distal member 60. The distal member 60 and the grip 50 are separate members. This causes vibrations from the hammer drill 1 to be transmitted to the metal band 22, the threaded shaft 30, and the distal member 60. The vibrations are transmitted from the attachment 22 to the threaded shaft 30 and from the basal portion 31 to the distal end of the threaded shaft 30, and are then transmitted to the grip 50 through the distal member 60 located adjacent to the distal end of threaded shaft 30. In this structure, vibrations being attenuated more are transmitted to the grip 50 than in a known structure. The grip 50 is thus less likely to receive such vibrations.

As shown in FIG. 3, the elastic member 70 is located between the outer circumferential surface of the base 40 and the inner circumferential surface of the grip 50. The grip 50 is thus held by the base 40 with the elastic member 70 in between. The elastic member 70 reduces vibrations transmitted from the base 40 to the grip 50.

As shown in FIG. 4, the grip 50 is linked to the base 40 in a rotatable manner with the linkage L. This reduces vibrations transmitted from the base 40 to the grip 50.

As shown in FIG. 4, the linkage L links the grip 50 to the base 40 to allow the grip 50 to tilt relative to the base 40 in the operating direction of the hammer drill 1. The grip 50 can thus efficiently reduce vibrations generated in the direction along the operation of the hammer drill 1.

As shown in FIG. 3, the elastic member 70 is located on a basal portion of the grip 50 opposite to the distal member 60. The elastic member 70 is thus located closer to the metal band 22 than to the distal member 60. This causes one end of the grip 50 to be linked to the base 40 in a rotatable manner with the linkage L located near the distal member 60. The other end of the grip 50 is held by the base 40 with the elastic member 70 in between. The grip 50 is thus held stably with respect to the base 40. The grip 50 is also less likely to receive vibrations from the hammer drill 1.

As shown in FIG. 4, the linkage L includes rotational shafts located in one of the grip 50 or the base 40, and shaft receivers located in the other of the grip 50 or the base 40 and holding the rotational shafts in a rotatable manner. The grip 50 is rotatable relative to the base 40 with the rotational shafts and the shaft receivers.

As shown in FIG. 4, the distal member 60 covers the opening in the shaft receivers and holds the rotational shafts in the shaft receivers. The distal member 60 thus forms a part of the linkage L.

As shown in FIG. 4, the rotational shafts are the protrusions 53 protruding inward from the inner circumferential surface of the grip 50. The shaft receivers are the recesses 43 with their openings in the distal end of the base 40. The distal end of the base 40 has its surface in contact with the contact surface 64 of the distal member 60. The grip 50 is thus rotatable relative to the base 40 with a simple structure including the protrusions 53 and the recesses 43. The distal member 60 has its surface in contact with the distal end of the base 40 to cover the openings of the recesses 43. This efficiently prevents the protrusions 53 from slipping off.

As shown in FIG. 3, the base 40 includes the cylindrical base body 41. The elastic member 70 is bonded to the outer circumference of the base body 41. This allows the elastic member 70 to be easily bonded to the base 40 to reduce a positional deviation of the elastic member 70.

As shown in FIG. 2, the distal member 60 has a larger diameter than the grip 50. This causes the hand holding the grip 50 to be caught on the distal member 60, preventing the hand from slipping off.

As shown in FIG. 1, the hammer drill 1 includes the side handle 10. This reduces vibrations transmitted to the user holding the side handle 10 to use the hammer drill 1. This reduces load on the user.

The embodiment described above may be modified variously. In the above embodiment, the work tool is the hammer drill 1 that strikes the drill bit 3*a* while rotating. In some embodiments, the work tool may be a striking tool that simply strikes a tip tool, such as a hammer tool for a chipping operation.

In the above embodiment, the distal member 60 has a circular cross section. In some embodiments, the distal member 60 may be shaped as appropriate and may have, for example, a rectangular cross section. The distal member 60 may eliminate the larger-diameter portion 61.

In the above embodiment, the attachment 22 is the metal band 22 formed from iron. In some embodiments, the attachment 22 may be formed from a metal other than iron, such as aluminum. In some embodiments, the attachment 22 may be formed from a resin instead of a metal.

In the above embodiment, the elastic member 70 is a sponge sheet. In some embodiments, the elastic member 70 may be formed from rubber or silicone. The elastic member 70 may be an endless ring. In this case, the elastic member 70 may be fitted, rather than bonded, to the outer circumferential surface of the base body 41. The elastic member 70 may be bonded to the inner circumferential surface of the grip 50. The elastic member 70 may be located closer to the distal member 60 from the middle of the base 40 in the axial direction.

The linkage L may be located closer to the metal band 22 from the middle of the base 40 in the axial direction. In the above embodiment, the rotational shafts in the linkage L are the protrusions 53 on the grip 50. In some embodiments, the rotational shafts in the linkage L may be pins separate from the grip 50 or the base 40. The protrusions 53 may be on the base 40, and the recesses 43 may be on the grip 50.

The hammer drill 1 according to the embodiment is an example of a work tool in an aspect of the present disclosure. The side handle 10 according to the embodiment is an example of an auxiliary handle in an aspect of the present disclosure. The metal band 22 in the embodiment is an example of an attachment in an aspect of the present disclosure.

Each protrusion 53 in the embodiment is an example of a rotational shaft in an aspect of the present disclosure. Each recess 43 in the embodiment is an example of a shaft receiver in an aspect of the present disclosure.

REFERENCE SIGNS LIST

1 hammer drill (work tool)
2 main housing
2*a* handle mount
2*b* locking tab
3 drill chuck
3*a* drill bit
4 main handle
4*a* switch lever
P output axis
10 side handle (auxiliary handle, auxiliary handle for work tool)
11 attachment unit
12 grip unit
21 cover
22 metal band (attachment)
23 engagement hole
24 projection
25 flange
30 threaded shaft
31 basal portion
32 external thread
40 base
41 base body
42 larger-diameter portion
43 recess (shaft receiver)
50 grip

51 grip body
52 flange
53 protrusion (rotational shaft)
L linkage
Q rotation axis
60 distal member
61 larger-diameter portion
62 protruding portion
63 internal thread
64 contact surface
65 extension
66 through-hole
70 elastic member
80 lock
81 coil spring
82 guide
83 lock member
84 engagement tab
85 stopper
H guide hole

What is claimed is:

1. An auxiliary handle for a work tool, the auxiliary handle being detachably attachable to the work tool, the auxiliary handle comprising:
an attachment being elongated and elastically deformable, the attachment being windable around an outer circumference of the work tool;
a threaded shaft including a basal portion connected to two ends of the attachment;
a base being cylindrical and receiving the threaded shaft;
a distal member being adjacent to a distal end of the base and receiving a distal end of the threaded shaft screwed into the distal member;
a grip being cylindrical and covering the base; and
an elastic member between an outer circumferential surface of the base and an inner circumferential surface of the grip.

2. The auxiliary handle according to claim 1, further comprising:
a linkage linking the grip to the base in a rotatable manner.

3. The auxiliary handle according to claim 2, wherein
the linkage includes
a rotational shaft in one of the grip or the base, and
a shaft receiver in the other of the grip or the base and holding the rotational shaft in a rotatable manner.

4. The auxiliary handle according to claim 3, wherein
the distal member covers an opening of the shaft receiver and holds the rotational shaft in the shaft receiver.

5. The auxiliary handle according to claim 4, wherein
the rotational shaft is a protrusion protruding inward from an inner circumferential surface of the grip,
the shaft receiver is a recess with an opening in the distal end of the base, and
the distal end of the base has a surface in contact with a contact surface of the distal member.

6. The auxiliary handle according to claim 3, wherein
the rotational shaft is a protrusion protruding inward from an inner circumferential surface of the grip,
the shaft receiver is a recess with an opening in the distal end of the base, and
the distal end of the base has a surface in contact with a contact surface of the distal member.

7. The auxiliary handle according to claim 2, wherein
the elastic member is located on a basal portion of the grip opposite to the distal member.

8. The auxiliary handle according to claim 2, wherein
the base includes a base body being cylindrical, and
the elastic member is bonded to an outer circumference of the base body.

9. The auxiliary handle according to claim 1, wherein the elastic member is located on a basal portion of the grip opposite to the distal member.

10. The auxiliary handle according to claim 9, wherein
the base includes a base body being cylindrical, and
the elastic member is bonded to an outer circumference of the base body.

11. The auxiliary handle according to claim 1, wherein
the base includes a base body being cylindrical, and
the elastic member is bonded to an outer circumference of the base body.

12. A hammer drill, comprising:
the auxiliary handle according to claim 1.

13. An auxiliary handle for a work tool, the auxiliary handle being detachably attachable to the work tool, the auxiliary handle comprising:
an attachment being elongated and elastically deformable, the attachment being windable around an outer circumference of the work tool;
a threaded shaft including a basal portion connected to two ends of the attachment;
a base being cylindrical and receiving the threaded shaft;
a distal member being adjacent to a distal end of the base and receiving a distal end of the threaded shaft screwed into the distal member;
a grip being cylindrical and covering the base; and
a linkage linking the grip to the base in a rotatable manner, wherein
the linkage links the grip to the base in a manner in which the grip is tiltable relative to the base in an operating direction of the work tool.

14. The auxiliary handle according to claim 13, wherein
the linkage includes
a rotational shaft in one of the grip or the base, and
a shaft receiver in the other of the grip or the base and holding the rotational shaft in a rotatable manner.

15. An auxiliary handle for a work tool, the auxiliary handle being detachably attachable to the work tool, the auxiliary handle comprising:
an attachment being elongated and elastically deformable, the attachment being windable around an outer circumference of the work tool;
a threaded shaft including a basal portion connected to two ends of the attachment;
a base being cylindrical and receiving the threaded shaft;
a distal member being adjacent to a distal end of the base and receiving a distal end of the threaded shaft screwed into the distal member; and
a grip being cylindrical and covering the base, wherein
the distal member has a larger diameter than the grip.

* * * * *